United States Patent [19]

Gettings

[11] 4,084,122
[45] Apr. 11, 1978

[54] DRIVE CIRCUIT FOR STEPPER MOTOR

[75] Inventor: Robert E. Gettings, Northbrook, Ill.

[73] Assignee: A. B. Dick Company, Chicago, Ill.

[21] Appl. No.: 734,304

[22] Filed: Oct. 20, 1976

[51] Int. Cl.² ............................................. H02K 37/00
[52] U.S. Cl. ................................................... 318/696
[58] Field of Search ............... 318/696, 685, 254, 138, 318/500

[56] References Cited

U.S. PATENT DOCUMENTS 3,486,096  12/1969  Van Cleave ......................... 318/696

*Primary Examiner*—Herman J. Hohauser
*Attorney, Agent, or Firm*—Peter S. Lucyshyn

[57] ABSTRACT

A drive circuit for energizing the winding of a stepper motor includes a first amplifier circuit which receives a unipolar input signal and depending upon the amplitude couples a positive or negative voltage potential to one terminal of the winding. A second amplifier circuit also receives the input signal and applies the same polarity voltage potential to a differentiating circuit. The differentiating circuit operates a transistor switch to couple for a predetermined period of time, a voltage potential of opposite polarity but equal in magnitude to that coupled to the first terminal of the winding, to the second terminal thereof. The application of the double voltage to the winding causes a rapid torque buildup and great acceleration to the stepper motor for a short period of time. The differentiating circuit includes a capacitor having a predetermined time constant which controls the period of time the opposite polarity voltage potential is applied to the second terminal of the winding.

8 Claims, 3 Drawing Figures

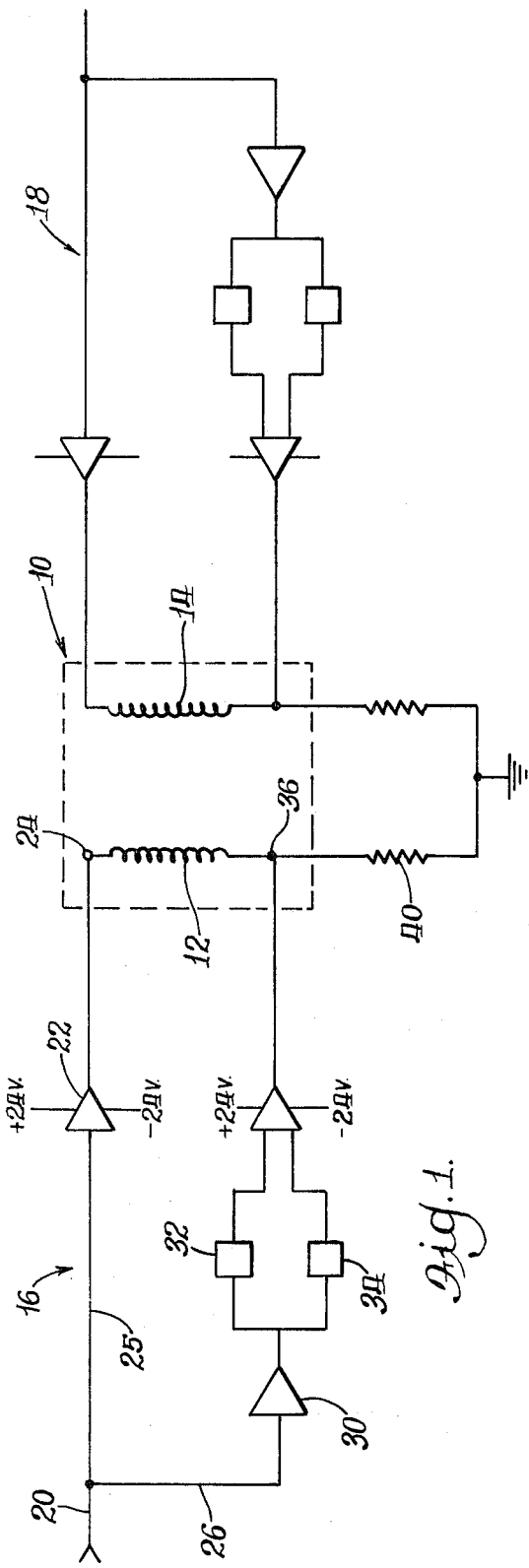
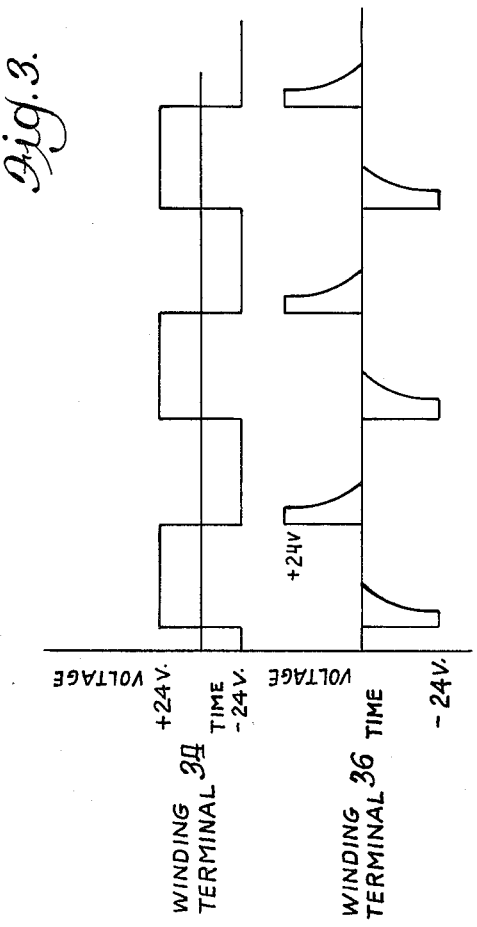

DRIVE CIRCUIT FOR STEPPER MOTOR

BACKGROUND OF THE INVENTION

This invention relates generally to stepper motors and more particularly to control circuitry therefor.

In the use of stepper motors for driving elements in a machine such as, for example, a microfiche copier wherein the fiche is held in a fixture driven by a stepper motor to position selected frames of the fiche into a proper working position, it is often required to provide rapid stepping and acceleration of the motor. Many methods for the provision of such rapid operation are known, such as, the use of storage capacitors or transformer devices to supply over-current to the stepping motor windings. Such prior art methods, however, prove to be unsatisfactory in certain instances because of the need to provide such additional elements.

SUMMARY OF THE INVENTION

Accordingly, it is a primary object of the present invention to provide new and improved circuitry for driving a stepper motor which provides for a short period of time, over-voltage to the windings thereof for rapid acceleration without the need for additional storage capacitors or transformers.

It is another object to provide a circuit of the above-described type which is relatively simple in construction yet efficient in operation.

Briefly, a preferred embodiment of the stepper motor drive circuit according to the invention comprises a first circuit to which an input pulse of a predetermined amplitude is applied. Depending upon the amplitude of the signal, the circuit couples a positive or negative voltage potential to a first terminal of the stepper motor winding.

A second circuit similar to the first also receives the input signal and provides a like polarity voltage to a differentiating circuit designed to detect the polarity of an incoming voltage signal. The differentiating circuit causes a switching transistor to be operated ON for a predetermined period of time to apply at the second terminal of the stepper motor winding, a voltage potential equal in magnitude to that applied to the first winding, but opposite in polarity. Thus, a double voltage is provided to the winding for a brief time to produce a rapid torque buildup for rapid acceleration of the stepper motor. The differentiating circuit includes capacitor means having a predetermined time constant. As such, the opposite polarity voltage appied by means of the differentiating circuit dissipates shortly after its initial application so that the only remaining voltage applied to the stepper motor winding is that at the first-mentioned terminal thereof. This voltage maintains the stepper motor fixed in that position until a subsequent stepper pulse is applied. The value of the capacitor means employed in the differentiating circuit may be varied to optimize the torque for different motors.

If the original input pulse is of a different amplitude, pulses of opposite polarity will be applied to the winding of the stepper motor. In this manner, forward and reverse movement of the motor may be obtained.

The stepper motor being driven by the circuitry described will include at least two windings 90° out of phase for sequentially stepping the motor. As such, a second stepper motor drive circuit of the type described is employed for the second winding to provide the over-voltage necessary for rapid acceleration when that motor winding is energized to step the motor.

DESCRIPTION OF THE DRAWING

In the drawings:

FIG. 1 is a block diagram of the stepper motor drive circuit according to the invention for use with a two winding stepper motor;

FIG. 3 is a graphical illustration of the application of over-voltage by the stepper motor drive circuit according to the invention to provide rapid acceleration of the stepper motor being controlled thereby.

DETAILED DESCRIPTION OF THE DRAWING

Figure 2:
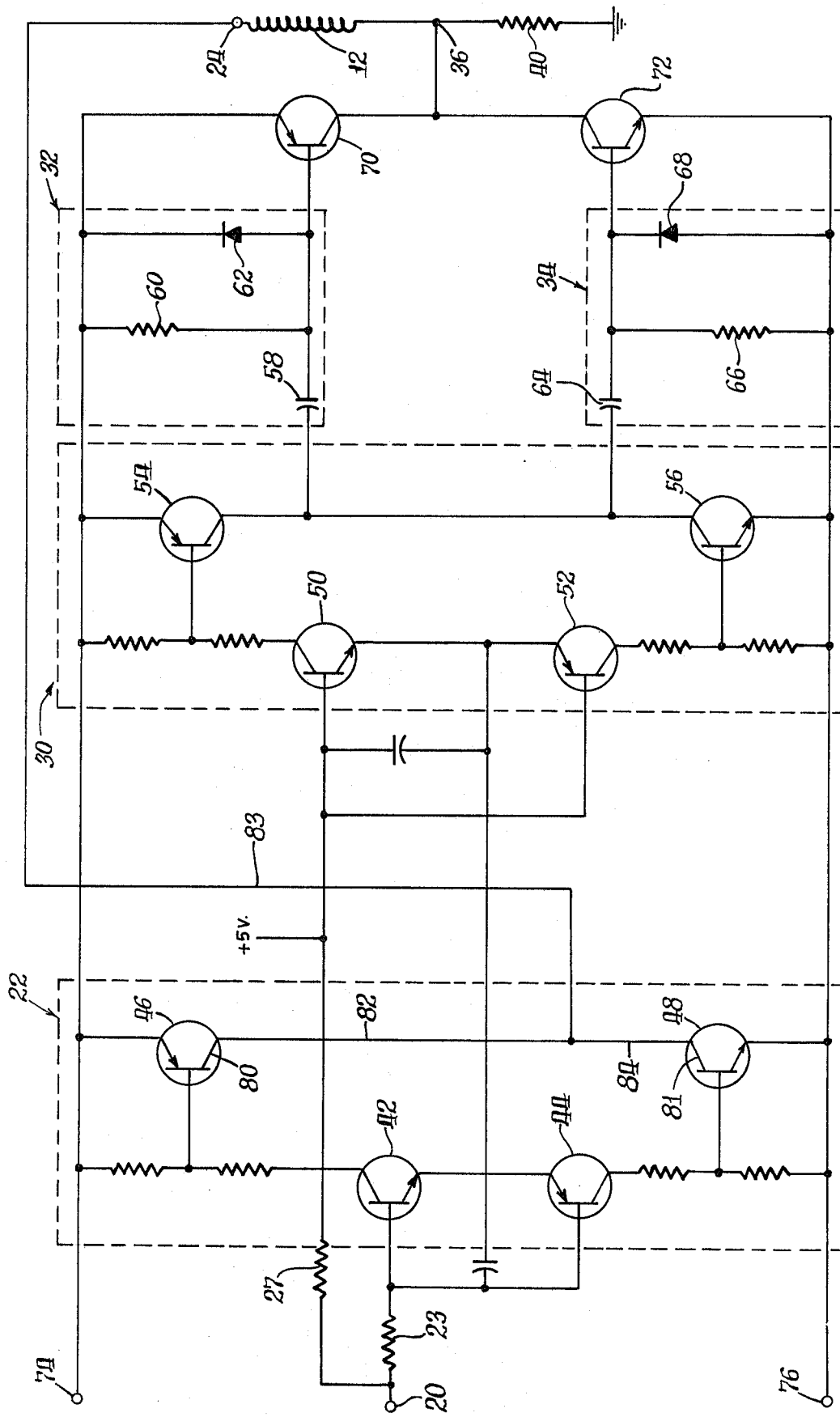
FIG. 2 is a schematic diagram of the stepper motor drive circuit according to the invention.

Referring now to the drawing in greater detail wherein like numerals have been employed throughout the various views to designate similar components, there is illustrated in FIG. 1 a block diagram of a circuit for driving a stepper motor 10 having a pair of motor windings 12 and 14, respectively. The windings are each driven by a circuit 16, 18, respectively, according to the invention. Because the circuits are alike, only circuit 16 will be described herein in detail.

To energize winding 12 of stepper motor 10 for stepping the motor, a unipolar input pulse of a predetermined amplitude is applied at input 20. The pulse is fed via leads 25, 26 to amplifying circuits 22, 30, respectively. The amplifying circuit 22 detects the amplitude of the incoming pulse and in response thereto functions to apply at terminal 24 at a first side of winding 12, either a positive or negative voltage signal of a predetermined amplitude. A twenty-four volt signal has been selected in a preferred embodiment of the circuit. Simultaneously, the input signal is received at the input of amplifying circuit 30. In the same manner as circuit 22, amplifying circuit 30 functions to apply a similar polarity voltage signal to first and second voltage detectors or differentiating circuits 32, 34. Differentiating circuit 32 detects the negative edge of the applied signal and differentiating circuit 34 senses the positive edge.

The differentiating circuit detecting the voltage signal operates to cause amplifier circuit 35 coupled thereto, functioning as a switch, to apply a voltage pulse of the opposite polarity but of the same magnitude as that applied to terminal 24, to terminal 36 at the opposite side of the winding 12. In this manner, a double voltage magnitude is provided across the winding 12 for a brief period of time to produce a rapid torque buildup therein. Each of the differentiating circuits 32, 34 includes a capacitor having a predetermined time constant which governs the application period of the voltage at terminal 36 of the winding.

The latter is illustrated in the graph of FIG. 3 wherein upon application of 24 volts of a first polarity to the terminal 24, an opposite polarity 24 volts is applied at terminal 36. The last-mentioned 24 volts dissipates exponentially while the former remains to maintain the motor in that position until the next pulse is applied thereto.

The resistor 40 of FIG. 1 connects the winding 12 to ground and limits the holding current therein in the stop position since the voltage at terminal 24 as illustrated is a constant value of either positive or negative polarity.

Thus, the stepper motor is driven with great acceleration for a short period of time to cause the work piece driven by the motor to be moved initially very rapidly.

This is most effective in the case of an electrostatic microfiche imaging apparatus wherein the fiche is held in a movable fixture driven by a stepper motor to place predetermined fiche frames in position for imaging.

Turning now to FIG. 2 of the drawing, there is shown a more detailed schematic diagram of the drive circuit according to the invention.

In the schematic diagram, transistors 42, 44, 46 and 48 connected as shown make up the amplifier circuit 22 of FIG. 1, transistors 50, 52, 54 and 56 connected in the same configuration as the last-mentioned transistors comprise the amplifier circuit 30 of FIG. 1, the network including capacitor 58, resistor 60 and diode 62 represent differentiating circuit 32, the network including capacitor 64, resistor 66 and diode 68 comprise differentiating circuit 34 and transistors 70, 72 represent switch 35.

A positive 24 volts is provided to the circuit at terminal 74 and a negative 24 volts is provided at terminal 76. The stepper input pulses are applied at the terminal 20.

The operation of the circuit is as follows: A stepper input pulse having an amplitude between 0 and 12 volts, is received at terminal 20. The pulse is applied via resistors 23, 27 to the bases of transistors 42, 44 of amplifier circuit 22 and 50, 52 of amplifier circuit 30, respectively. The last-mentioned transistors function as voltage detectors. The emitters of the transistors are biased positively at 5 volts. Thus, if the input pulse is greater than 5 volts, transistors 42 and 50 conduct. If the input pulse is less than 5 volts, transistors 44 and 52 conduct.

When transistor 42 is turned ON, it biases switching transistor 46 ON also to apply a positive 24 volts via collector 80 and leads 82, 83, to terminal 24 of motor winding 12. In the case wherein the transistor 44 is turned ON, switching transistor 48 is biased ON to apply a negative 24 volts via collector 81 and leads 84, 83 to the terminal 24 of winding 12.

Simultaneously with the application to terminal 24 of either a positive or negative 24 volts for stepping the motor in a forward or reverse direction as the case may be, an opposite polarity 24 volts is applied at terminal 36 of the winding 12. To accomplish the latter, a corresponding one of the voltage detecting transistors 50, 52 of amplifier circuit 30 is biased ON. In turn either transistor 54 or transistor 56, respectively, conducts to apply a 24 volts signal of similar polarity to the differentiating networks 32, 34, respectively. For example, if the amplifier circuit 22 applies a positive 24 volts to the terminal 24 of winding 12, similarly transistor 54 of amplifier circuit 30 applies a positive 24 volts to the differentiating circuits 32, 34. In this case, differentiating circuit 34 senses the positive-going signal and in turn causes transistor 72 to conduct. When transistor 72 is biased ON, it applies a negative 24 volts from terminal 76 to the other side (terminal 36) of winding 12. Likewise, if a negative going signal is applied at terminal 24, a similar signal is detected by differentiating circuit 32. As such, transistor 70 will be biased ON and a positive 24 volts will be applied from terminal 74 to the terminal 36 of winding 12. This signal applied at terminal 36 is applied only for a short period of time. The latter is controlled by the time constant of the capacitors 58, 64 of the differentiating circuits 32, 34, respectively. The values of capacitors 58 and 64 of the differentiating circuits can be varied to optimize the torque for different motors.

In all cases, opposite polarity voltages of equal magnitude (24 volts) are applied to the terminals 24 and 36, respectively, of winding 12 to cause over-volting thereof for rapid stepping of the motor. The pulse of opposite and equal amplitude applied at terminal 36 quickly dissipates the stored energy in the motor winding and provides the rapid torque buildup necessary for rapid acceleration in the motor.

Once again as illustrated in the graph of FIG. 3, the voltage applied at the terminal 36 which is of an opposite polarity but of equal magnitude to the voltage applied at terminal 24 of motor winding 12, decays to zero while the voltage at terminal 24 remains until the next stepping pulse is provided to the motor windings.

In practical application, at least two motor windings 90° out of phase are necessary to step the motor. The second stepper winding will employ a drive circuit similar to that described herein (as illustrated in FIG. 1). As such, rapid acceleration of the motor will be achieved for continual stepping of the motor in a forward or reverse direction.

It should be noted that specific voltage values given herein are only by way of example for a preferred embodiment of the stepper circuit according that while a particular embodiment of the invention has been described, the invention is not limited thereto since many modifications may be made. It is therefore contemplated to cover by the present application any and all such modifications as fall within the true spirit and scope of the appended claims.

What I claim is:

1. A drive circuit for energizing the winding of a stepper motor in response to an input pulse applied thereto, including in combination:
   a source of bipolar voltage,
   first circuit means coupled to said voltage source and the first terminal of said stepper motor winding, and second circuit means coupled to said voltage source and the second terminal of said stepper motor winding, said first and second circuit means receiving simultaneously a stepper motor pulse and in response thereto said first circuit means applying to said first terminal a voltage of a first polarity of a predetermined magnitude and said second circuit means applying to said second terminal for a predetermined time period only, a voltage of opposite polarity but of a magnitude substantially equal to that applied to said first terminal, whereby a double voltage is applied across said winding for rapid torque builup in said stepper motor.

2. A stepper motor drive circuit as claimed in claim 1 wherein said second circuit means includes voltage detector means for sensing a predetermined characteristic of said input pulse and means responsive thereto for applying to the second terminal of said winding a voltage opposite in polarity but of substantially equal magnitude to that applied at said first terminal of said winding.

3. A stepper motor drive circuit as claimed in claim 2 further including first and second differentiating networks, and wherein said means responsive to said predetermined characteristic of said input pulse comprises first circuit element means operative to supply a voltage signal of a first polarity to said differentiating networks if the amplitude of said input pulse is greater than a predetermined amplitude and to supply a voltage signal of a second polarity to said differentiating networks if the amplitude of said input pulse is less than a predetermined amplitude, said first differentiating network being responsive to the receipt of one of said positive and negative voltage signals and said second differentiating network being responsive to the receipt of the other of said positive and negative voltage signals, respectively, to supply for said predetermined time period form said bipolar voltage source to said second terminal, a voltage signal of opposite polarity but of substantially equal magnitude to that applied to said first terminal.

4. A stepper motor drive circuit as claimed in claim 3 wherein each said differentiating network includes capacitor means having a predetermined time constant, said capacitor means controlling the period of time that said voltage signal is applied to the second terminal of said winding.

5. A stepper motor drive circuit as claimed in claim 1 wherein said first and second circuit means each include voltage detector and switch means, each having an input and an output, the inputs of said first and second voltage detector and switch means coupled for receiving an input pulse simultaneously and in response to a predetermined characteristic thereof, each providing at the output thereof a voltage signal of a predetermined polarity and magnitude, said first circuit means applying said last-mentioned output voltage signal to said first terminal of said winding, said drive circuit further including differentiating circuit means coupled between the output of said second voltage detector and switch means and said second terminal of said stepper motor winding, said differentiating circuit means receiving said voltage signal from said second voltage detector and switch means and in response thereto applying from said bipolar voltage source to the second terminal of said winding for a predetermined period of time only, a voltage signal substantially equal in magnitude to the signal applied to said first terminal, but opposite in polarity.

6. A stepper motor drive circuit as claimed in claim 5 wherein said differentiating circuit means comprise a circuit arrangement including capacitor means having a predetermined time constant, said capacitor means controlling the period of time of application of said voltage signal by said differentiating means to said second terminal of said stepper motor winding.

7. A stepper motor drive circuit as claimed in claim 5 wherein each said voltage detector and switch means include first and second solid state means, said first solid state means being operative in response to the receipt of an input pulse having an amplitude above a predetermined level to provide a voltage signal of one of a positive and negative polarity at the output thereof and said second solid state means being operative in response to the receipt of an input pulse having an amplitude below a predetermined level to provide a voltage signal of the other of a positive and negative polarity at the output thereof, the output of said voltage detector and switch means of said first circuit means coupled to said first terminal for application of said output voltage thereto and further said differentiating means having first and second voltage detector circuits, said first and second voltage detector circuits coupled between said first and second solid state means of said second voltage detector and switch means and said second terminal of said stepper motor winding, said first voltage detector circuit of said second voltage detector and switch means sensing the output of said first solid state means and in response thereto providing for said predetermined time period, an opposite polarity voltage signal of a magnitude equal to that applied to said first terminal of said winding, to said second terminal and said second voltage detector circuit of said second voltage detector and switch means sensing the output of said second solid state means and in response thereto providing for said predetermined time period an opposite polarity voltage signal of an amplitude equal to that applied to said first terminal of said winding, to said second terminal of said winding, respectively.

8. A stepper motor drive circuit as claimed in claim 7 wherein each said first and second voltage detector circuits of said differentiating means comprises a network including a capacitor having a predetermined time constant and a transistor switch having an input and an output, the input of said transistor switch being coupled to said network and the output thereof coupled to the second terminal of said stepper motor winding, said transistor switch also being coupled to said source of bipolar voltage, whereby upon the detection of an output from a corresponding one of said first and second solid state means, a corresponding one of said transistor switches is operated to apply at the second terminal of said winding the voltage signal of a magnitude equal to that applied at the first terminal of said winding, but of opposite polarity, said capacitor controlling the period of time said last-mentioned voltage signal is applied to said terminal.

* * * * *

UNITED STATES PATENT AND TRADEMARK OFFICE
CERTIFICATE OF CORRECTION

PATENT NO. : 4,084,122
DATED : April 11, 1978
INVENTOR(S) : Robert E. Gettings

It is certified that error appears in the above-identified patent and that said Letters Patent are hereby corrected as shown below:

Column 5, line 5, "form" should read --- from ---.

Signed and Sealed this

Thirty-first Day of July 1979

[SEAL]

Attest:

Attesting Officer

LUTRELLE F. PARKER
Acting Commissioner of Patents and Trademarks